United States Patent
Filsfils et al.

(10) Patent No.: US 10,171,338 B2
(45) Date of Patent: Jan. 1, 2019

(54) ON-DEMAND NEXT-HOP RESOLUTION

(71) Applicant: CISCO TECHNOLOGY, INC., San Jose, CA (US)

(72) Inventors: Clarence Filsfils, Brussels (BE); Bertrand Duvivier, Wepion (BE); Muthurajah Sivabalan, Kanata (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/426,911

(22) Filed: Feb. 7, 2017

(65) Prior Publication Data
US 2017/0230274 A1 Aug. 10, 2017

Related U.S. Application Data

(60) Provisional application No. 62/292,697, filed on Feb. 8, 2016.

(51) Int. Cl.
| | | |
|---|---|---|
| *H04L 12/28* | (2006.01) | |
| *H04L 12/751* | (2013.01) | |
| *H04L 12/46* | (2006.01) | |
| *H04L 12/741* | (2013.01) | |
| *H04L 12/851* | (2013.01) | |
| *H04L 12/803* | (2013.01) | |
| *H04L 12/717* | (2013.01) | |
| *H04L 12/753* | (2013.01) | |

(52) U.S. Cl.
CPC .......... *H04L 45/02* (2013.01); *H04L 12/4633* (2013.01); *H04L 12/4641* (2013.01); *H04L 45/42* (2013.01); *H04L 45/48* (2013.01); *H04L 45/74* (2013.01); *H04L 47/125* (2013.01); *H04L 47/2425* (2013.01)

(58) Field of Classification Search
CPC ................. H04L 45/02; H04L 12/4641; H04L 12/4633; H04L 45/48; H04L 45/42; H04L 47/125; H04L 47/2425; H04L 45/74
See application file for complete search history.

(56) References Cited

U.S. PATENT DOCUMENTS

| 9,660,897 | B1 * | 5/2017 | Gredler | H04L 45/04 |
|---|---|---|---|---|
| 2014/0269422 | A1 * | 9/2014 | Filsfils | H04L 41/12 370/254 |
| 2016/0366051 | A1 * | 12/2016 | Chen | H04L 45/50 |
| 2017/0012895 | A1 * | 1/2017 | Zhao | H04L 47/724 |
| 2017/0093685 | A1 * | 3/2017 | Retana | H04L 45/02 |

(Continued)

OTHER PUBLICATIONS

Sivabalan, S., et al., "Carrying Binding Label/Segment-ID in PCE-based Networks," PCE Working Group, Apr. 23, 2015, 9 pages; https://tools.ietf.org/pdf/draft-sivabalan-pce-binding-label-sid-00.pdf.

(Continued)

*Primary Examiner* — Clemence S Han (57) ABSTRACT

Embodiments of the present disclosure relate to methods and systems for on-demand next-hop resolution. Aspects of the embodiments include receiving a triggering event to prompt a request for a path to a network location; requesting a path computation from a second network element based on receiving the triggering event; receiving the path computation from the second network element; and programming an output interface with an indication of the path computation received from the second network element.

23 Claims, 3 Drawing Sheets

(56) References Cited

U.S. PATENT DOCUMENTS

2017/0346720 A1\* 11/2017 Lazzeri ............... H04L 45/124
2018/0019944 A1\* 1/2018 Peng .................. H04L 45/507
2018/0034730 A1\* 2/2018 Zhao .................. H04L 45/507

OTHER PUBLICATIONS

Filsfils, C., et al., "Interconnecting Millions of Endpoints With Segment Routing," Network Working Group, Dec. 7, 2016, 11pages; https://tools.ietf.org/pdf/draft-filsfils-spring-large-scale-interconnect-05.pdf.

\* cited by examiner

ON-DEMAND NEXT-HOP RESOLUTION

CROSS REFERENCE TO RELATED APPLICATION

This application claims the benefit of priority under 35 U.S.C. § 119(e) to U.S. Provisional Application Ser. No. 62/292,697, entitled "ON-DEMAND NEXT-HOP RESOLUTION," filed Feb. 8, 2016." The disclosure of the prior applications are considered part of (and are incorporated by reference in) the disclosure of this application.

TECHNICAL FIELD

This disclosure relates in general to the field of communications and, more particularly, to methods and systems for on-demand next-hop resolution.

BACKGROUND

On-Demand Routing (ODR) is an enhancement to Cisco Discovery Protocol (CDP), a protocol used to discover other Cisco devices on either broadcast or non-broadcast media. With the help of CDP, it is possible to find the device type, the Internet Protocol (IP) address, the Cisco IOS® version running on the neighbor Cisco device, the capabilities of the neighbor device, and so on. In Cisco IOS software release 11.2, ODR was added to CDP to advertise the connected IP prefix of a stub router via CDP. This feature takes an extra five bytes for each network or subnet, four bytes for the IP address, and one byte to advertise the subnet mask along with the IP. ODR is able to carry Variable Length Subnet Mask (VLSM) information.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In various aspects, embodiments presented herein may relate to computer-implemented methods and systems for on-demand next-hop resolution (ODR).

Moreover, a computer program for carrying out the methods described herein, as well as a, preferably non-transitory, computer readable storage-medium storing the computer program are provided. A computer program may, for example, be downloaded (updated) to the existing network devices and systems (e.g. to the existing routers, switches, various control nodes, etc.) or be stored upon manufacturing of these devices and systems.

As will be appreciated by one skilled in the art, aspects of the present disclosure, in particular the functionality of the on-demand next-hop resolution described herein, may be embodied as a system, a method or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g. a microprocessor, of a computer. Furthermore, aspects of the present disclosure may take the form of a computer program product embodied in one or more computer readable medium(s) having computer readable program code embodied, e.g., stored, thereon.

Example Embodiments

Disclosed are, inter alia, methods, apparatus, data structures, computer-readable medium, mechanisms, and means for on-demand next-hop resolution.

IP routers forward traffic according to routes (i.e. IP address prefixes). ODR uses Cisco Discovery Protocol (CDP) to propagate the IP prefix. ODR is a feature that provides IP routing for stub sites, with minimum overhead. The overhead of a general, dynamic routing protocol is avoided without incurring the configuration and management overhead of static routing.

In order to help the reader, first the problem is described with a specific use case applied to Segment Routing (SR) in large-scale aggregation. Then, the objective and the problem statement are generalized.

An Internet-Draft "Interconnecting Millions Of Endpoints With Segment Routing" (e.g. version of January 2016) describes an application of SR to scale the network to support hundreds of thousands of network nodes, and tens of millions of physical underlay endpoints. This use-case can be applied to the interconnection of massive-scale data centers (DC's) and/or large aggregation networks. The version of January 2016 of this document focuses on the MPLS/SR instantiation where no new protocol extensions are required.

Reference Design

Figure 1:
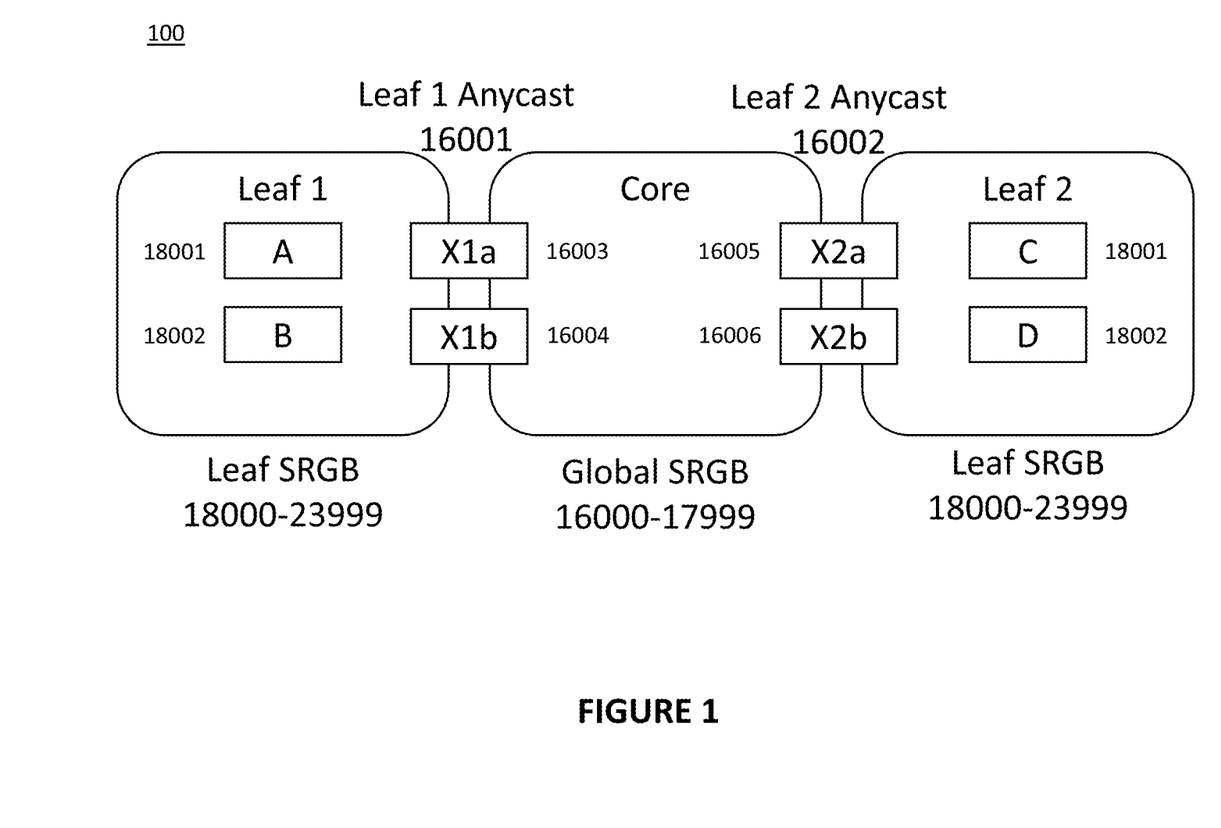
FIG. 1 depicts a reference design, according to one embodiment of the present disclosure.

FIG. 1 illustrates a reference design provided in this disclosure, where the following notation is used:

A: PrefixSID 18001 is unique in L1
B: PrefixSID 18002 is unique in L1
X1$a$: Anycast PrefixSID 16001 is unique across all the domains
PrefixSID 16003 is unique across all the domains
X1$b$: Anycast PrefixSID 16001 is unique across all the domains
PrefixSID 16004 is unique across all the domains
X2$a$: Anycast PrefixSID 16002 is unique across all the domains
PrefixSID 16005 is unique across all the domains
X2$b$: Anycast PrefixSID 16002 is unique across all the domains
PrefixSID 16006 is unique across all the domains
C: PrefixSID 18001 is unique in L2
D: PrefixSID 18002 is unique in L2

Consider a network structured into leaf domains (L1, L2, . . . ) interconnected by a central core domain C. Each domain runs segment routing (SR) for example with its own independent routing protocol (e.g.: ISIS, OSPF, BGP). A common segment routing global block (SRGB) of [16000-23999] is assumed (any other common block choice is possible) across all of the domains. It is further assumed that [16000-17999] is solely used to provide prefix segments in the Core (C) domain (any other choice is possible), while [18000, 23999] is reused to provide prefix segments in any leaf domain. For example, A and C of the leaf domain L1 and L2 respectively, receive the prefix segment 18001 while prefix segment 16003 is allocated to node X1a in the C domain and is unique across the entire set of domains.

Each leaf domain $L_k$ connects to the domain C with 2 or more nodes called $X_{ka}$ and $X_{kb}$. Each X node runs two independent SR routing protocols: one in the leaf domain and one in the core domain. Each X nodes is provided with two prefix segments allocated from the domain C: one uniquely identifies the node while the other (anycast prefix segment) identifies the pair number k of X nodes interconnecting the leaf domain k to the core domain.

In the reference diagram of FIG. 1, X1a has prefix segment 16003 and anycast prefix segment 16001 while X1b has prefix segment 16004 and anycast prefix segment 16001.

No route is redistributed from a leaf domain to the core domain. All the routes (and their prefix SID's) of the X nodes are redistributed from the core domain into the leaf domains. No other route is redistributed from the core into the leaf domains. A Forwarding Information Base (FIB) of an interior node within the C domain does not hold any entry for segments in the range [18000, 23999]. A node in a leaf domain only has FIB entries for all the segments in the local leaf domain and prefix segments towards all the X nodes in the network. For example, A of leaf L1 has a FIB entry for anycast segment 16002 which leads to the pair X2a and X2b and prefix segment 16005 which leads to X2a.

Leaf to Leaf Connectivity

Notation A.L1 is used to represent the node A of leaf domain L1. Leveraging the above design, any leaf node can be interconnected with any other leaf node.

Intraleaf, shortestpath: A.L1 uses the following SID list to reach B.L1: {18002}

Interleaf, shortestpath through any X: A.L1 uses the following SID list to reach D.L2 via any intermediate X:{116002, 18002}

Interleaf, shortestpath through a specific X: A.L1 uses the following SID list to reach D.L2 via X2a: {116005, 18002}

Ways are needed for a leaf to learn and compute the above interdomain SID lists without any interdomain routing protocol (e.g. BGP).

Embodiments of the present disclosure are based on an insight that, while millions of leaves exist in the targeted environment, each leaf only talks to a few other leaves. Distributing millions of reachabilities to millions of leaves would not scale and would be very inefficient.

To solve this problem, an on-demand solution is disclosed herein. Such a solution is advantageous for scalability reasons.

Embodiments of the present disclosure are explained with reference to an example of how A.L1 gets the SID list {16002, 18002} to reach D.L2. Since the intradomain path is known via IGP/SR, the focus herein is on the interdomain path.

In such an example, A.L1 needs to speak to D.L2 because A.L1 has an overlay service route to D.L2. The on-demand TRIGGER for A.L1 to request the reachability of D.L2 is the provisioning of an overlay service route at A.L1 with a next-hop being D.L2. The provisioning of this service route may be orchestrated by a solution such as Tail-F or similar.

A solution can preferably seamlessly support the addition of Traffic Engineering (TE) optimization objectives and constraints.

A New API Between RIB Client and RIB

When A.L1 is provisioned (e.g. by Tail-F or overlay service orchestration) with an overlay/service route to D.L2, A's overlay/service process requests the Routing Information Base (RIB) process for a matching path to D.L2, and with an on-demand RIB resolution if RIB does not have a match.

When the RIB process does not have a match and the new API is used, RIB calls the segment routing traffic engineering (SRTE) process for reachability to D.L2.

Eventually, SRTE's return call consists in a Binding Segment ID (SID) to a dynamically created SRTE tunnel to D.L2.

RIB provides the Binding SID to the overlay/service process.

The overlay/service process installs the service route recursing on the Binding SID.

A New API between RIB and SRTE

RIB asks the SRTE component to get reachability to D.L2.

SRTE checks whether it can locally compute a path with the desired SLA. This would be the case when the minimization objective is a cumulative metric (cost, latency, etc.), when the constraints involve the inclusion/exclusion of topological properties (affinity, SRLG, IP address) and especially when the destination is in the same LSDB.

If the SRTE process cannot locally compute a path (e.g., because of multi-domain and/or disjointness requirement between two pairs of service endpoints), the SRTE component sends a PCEP request to the path computation element (PCE) server (e.g. 9.9.9.9/32).

PCE server computes that D.L2 is reachable via {16002, 18002} and sends the answer back to the router.

It should be noted that the req/reply is stateful and whenever the multi-domain topology changes, 9.9.9.9 will send the updated segment list to the router.

SRTE installs the segment list as a dynamic SRTE tunnel and gets a binding SID for that tunnel.

SRTE's return API call to RIB is "Success" and provides the Binding SID of the SRTE tunnel to D.L2.

When the RIB client deletes its request, the RIB process deletes its request to the SRTE component, the SRTE component deletes its PCEP stateful request to 9.9.9.9, SRTE removes the dynamic tunnel and frees the binding SID.

Addition of a Traffic Engineering Attribute-Set to the Service Configuration

A service/overlay configuration consists of three parts: the service/overlay (L2 PW, L3VPN destination), a next-hop where this service is located and an ID used by that next-hop to identify the service (e.g., PW, VRF).

The addition of a fourth element to the service expression is proposed herein: a TE attribute-set.

When present, this attribute-set would describe the TE optimization objectives and constraints (i.e. the SLA required by the overlay service) to reach the next-hop for this service.

For example, if the service is configured to a next-hop 1.1.1.1 with the attribute-set LAT and the latter is defined as mpls traffic-eng attribute-set p2p-te LAT, path-selection metric latency, then the service/overlay component makes a RIB call for (1.1.1.1, attribute-set LAT). If RIB does not have a match, then RIB calls SRTE for (1.1.1.1, attribute-set LAT, etc.), the process then continues as explained previously up to the return of a binding SID which implements a low-latency path to the remote service/overlay component.

As a result of this straight-forward extension, any TE optimization objective or constraint can be included in the on-demand RIB Resolution.

Thus, a scalable automated on-demand RIB resolution with support for TE optimization objective and constraints is provided.

Advantages of the proposed solution include automation (once the overlay service is programmed, the RIB resolution is triggered automatically), service level agreement (SLA) awareness (the on-demand RIB entry to the remote overlay/service endpoint may include any SLA requirement expressed in terms of TE optimization objective and TE constraints), scalability (a router only needs to store the few 10/100's of RIB entries it really needs, which is a very small subset of the millions of paths known in the network), and Inter-Domain applicability (the solution equally works in single domain or interdomain due to the automated leverage of the SR PCE infrastructure).

In addition, the proposed solution advantageously provides a much simpler model for Software Defined Networking (SDN) deployment by splitting the responsibilities and then combining the parts together: first, the overlay/service orchestration programs the endpoint with an overlay/service entry which has a next-hop and an SLA policy (N, SLAT); then, ODR dynamically makes a call to SRTE to instantiate a RIB entry for (N, SLAT) (a Binding SID is allocated to that entry. This uses distributed intelligence when possible, and a centralized PCE when required); and finally, the overlay/service route is installed in RIB/FIB with a recursion on the provided binding SID.

Still further, the proposed solution advantageously provides automated steering with performance. The overlay/service route is directly steered on its required path with its required SLA due to the recursion on the binding SID. No complex PBR needs to be configured and maintained by the operator or the SDN solution. Performance is optimum as the recursion on the Binding SID takes the same FIB lookup as a recursion on an IPv4 next-hop (PBR performance tax is avoided).

Exemplary Data Processing System

Figure 2:
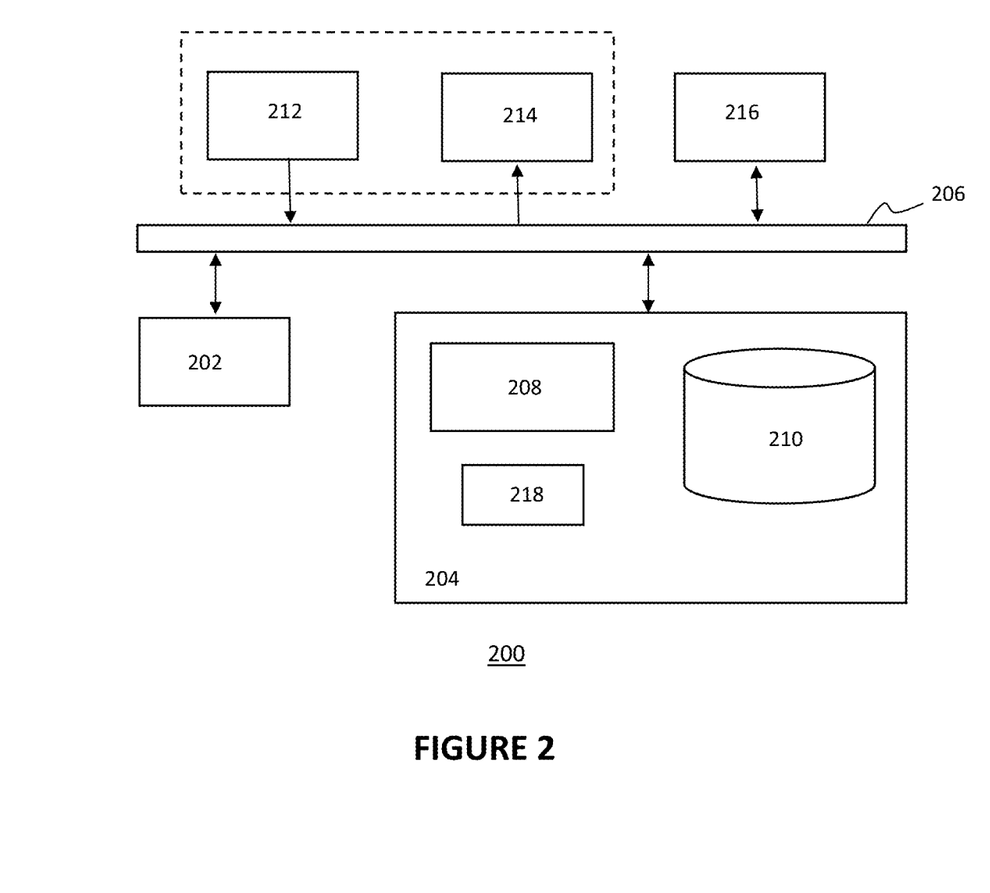
FIG. 2 depicts a block diagram illustrating an exemplary data processing system that may be used to implement on-demand next-hop resolution, according to one embodiment of the present disclosure.

FIG. 2 depicts a block diagram illustrating an exemplary data processing system 200 that may be used to implement on-demand next-hop resolution as described herein, according to one embodiment of the present disclosure.

As shown in FIG. 2, the data processing system 200 may include at least one processor 202 coupled to memory elements 204 through a system bus 206. As such, the data processing system may store program code within memory elements 204. Further, the processor 202 may execute the program code accessed from the memory elements 204 via a system bus 206. In one aspect, the data processing system may be implemented as a computer that is suitable for storing and/or executing program code. It should be appreciated, however, that the data processing system 200 may be implemented in the form of any system including a processor and a memory that is capable of performing the functions described within this specification.

The memory elements 204 may include one or more physical memory devices such as, for example, local memory 208 and one or more bulk storage devices 210. The local memory may refer to random access memory or other non-persistent memory device(s) generally used during actual execution of the program code. A bulk storage device may be implemented as a hard drive or other persistent data storage device. The processing system 200 may also include one or more cache memories (not shown) that provide temporary storage of at least some program code in order to reduce the number of times program code must be retrieved from the bulk storage device 210 during execution.

Input/output (I/O) devices depicted as an input device 212 and an output device 214 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 2 with a dashed line surrounding the input device 212 and the output device 214). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 216 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 200, and a data transmitter for transmitting data from the data processing system 200 to said systems, devices and/or networks. Modems, cable modems, and Ethernet cards are examples of different types of network adapter that may be used with the data processing system 200.

As pictured in FIG. 2, the memory elements 204 may store an application 218. In various embodiments, the application 218 may be stored in the local memory 208, the one or more bulk storage devices 210, or apart from the local memory and the bulk storage devices. It should be appreciated that the data processing system 200 may further execute an operating system (not shown in FIG. 2) that can facilitate execution of the application 218. The application 218, being implemented in the form of executable program code, can be executed by the data processing system 200, e.g., by the processor 202. Responsive to executing the application, the data processing system 200 may be configured to perform one or more operations or method steps described herein.

Persons skilled in the art will recognize that while the elements 202-218 are shown in FIG. 2 as separate elements, in other embodiments their functionality could be implemented in lesser number of individual elements or distributed over a larger number of components.

Example Implementation

Figure 3:
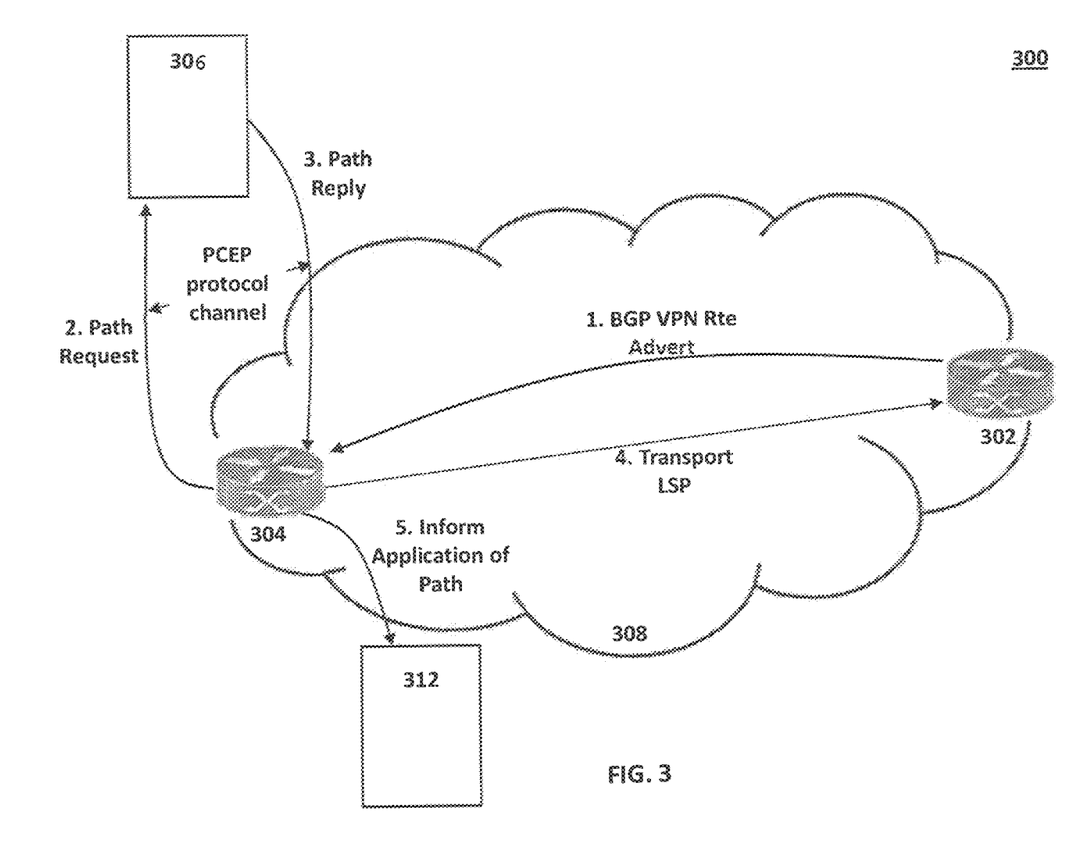
FIG. 3 is a schematic diagram of an example system implementation for on-demand next-hop resolution in accordance with embodiments of the present disclosure.

FIG. 3 is a schematic diagram of an example system 300 implementation for on-demand next-hop resolution in accordance with embodiments of the present disclosure. Example system 300 includes an egress provider edge (PE) router 302 and an ingress PE router 304 interconnected through a network 308. At the outset, the egress PE router 302 can advertise a BGP VPN route set (1). The ingress PE router 304 can identify a path for the egress PE router 302. For example, if the ingress PE router 304 has sufficient information about the network topology, including the egress PE router 302, the ingress PE router 304 can perform a path computation. If, however, the ingress PE router 304 does not have sufficient information to make a path computation, the ingress PE router 304 can request a path computation from a stateful PCE 306 through, e.g., a PCEP protocol (2). The stateful PCE 306 can compute a path on demand and communicate that path to the ingress PE router 304 (3). The stateful PCE 306 can include traffic engineering as a factor in computing a path (such as RSVP-TE or segment routing). The ingress PE router 304 can program the computed path in an output interface for communications with the egress PE 302 (4). For example, the ingress PE router 304 can establish a transport link state packet (LSP) with a VPN route as an output interface for the egress PE router 302. Once the ingress PE router 304 receives a path computation from the PCE 306, the ingress PE router 304 can inform an application, such as a BGP table 312, of the computed path (5).

Variations and Implementations

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) communications for the transmission and/or reception of packets in a network.

As used herein, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the on-demand next-hop resolution operations thereof. This may be inclusive of appropriate algorithms and communication protocols that allow for the effective exchange of data or information.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

In one implementation, autonomous systems, data centers and/or various network elements such as e.g. routers described herein may include software to achieve (or to foster) the functions discussed herein for on-demand next-hop resolution where the software is executed on one or more processors to carry out the functions. This could include the implementation of instances of any suitable element that would foster the activities discussed herein. Additionally, each of these elements can have an internal structure (e.g., a processor, a memory element, etc.) to facilitate some of the operations described herein. In other embodiments, these functions for on-demand next-hop resolution may be executed externally to these elements, or included in some other network element to achieve the intended functionality. Alternatively, autonomous systems, data centers and/or various network elements described herein may include software (or reciprocating software) that can coordinate with other network elements in order to achieve the on-demand next-hop resolution functions described herein. In still other embodiments, one or several devices may include any suitable algorithms, hardware, software, components, modules, interfaces, or objects that facilitate the operations thereof.

In certain example implementations, the on-demand next-hop resolution functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases such as e.g. policy or mapping databases to enable on-demand next-hop resolution functions disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving on-demand next-hop resolution, as outlined herein. Additionally, each of these devices may include a processor that can execute software or an algorithm to perform the on-demand next-hop resolution activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of on-demand next-hop resolution, as potentially applied to a myriad of other architectures.

It is also important to note that the steps described herein only some of the possible scenarios that may be executed by, or within, the autonomous systems, data centers, on-demand next-hop resolution logic, and various network elements described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims;

and (b) does not intend, by any statement in the specification, to limit this disclosure in any way that is not otherwise reflected in the appended claims.

What is claimed is:

1. A method comprising:
   at a first network element in a first leaf domain among leaf domains interconnected by a core domain, the leaf domains and the core domain each configured to perform segment routing with an independent segment routing protocol based on a first block of segment prefix identifiers solely for the core domain, and a second block of segment identifiers for reuse across the leaf domains:
   receiving a triggering event to prompt a request for a path to a second network element in a second domain among the leaf domains, the triggering event including provisioning the first network element with an overlay service route identifying the second network element as a next hop for a service;
   determining the path based on the triggering event without performing any interdomain routing protocol operations, wherein the path includes an interdomain segment identifier list having a segment identifier from the first block and a segment identifier from the second block; and
   programming an output interface of the first network element with the interdomain segment identifier list of the path.

2. The method of claim 1, wherein the provisioning the overlay service route includes identifying a layer-2 pseudo-wire destination, the next hop, the service, and a traffic engineering attribute-set describing traffic engineering objectives and constraints to reach the next hop for the service.

3. The method of claim 1, wherein programming the output interface comprises installing a segment routing traffic engineered tunnel and a corresponding segment identifier for the second network element.

4. The method of claim 1, wherein determining the path comprises:
   requesting a path computation from a third network element based on receiving the triggering event; and
   receiving the path computation from the third network element, the path computation to include the interdomain segment identifier list.

5. The method of claim 4, wherein the third network element comprises a routing information base.

6. The method of claim 4, wherein the third network element comprises a stateful path computation element.

7. The method of claim 6, wherein programming the output interface comprises establishing a transport link state packet for the second network element.

8. The method of claim 6, wherein the second network element comprises an egress provider edge router.

9. The method of claim 6, wherein the triggering event comprises receiving a border gateway protocol (BGP) virtual private network (VPN) route advertisement from the second network element.

10. The method of claim 6, wherein the first network element comprises an ingress provider edge router.

11. The method of claim 4, wherein the path computation received comprises one or more traffic engineering considerations, the one or more traffic engineering considerations comprising a service layer agreement.

12. One or more non-transitory computer readable storage media encoded with software comprising computer executable instructions and when the software is executed by a processor of a first network element in a first leaf domain among leaf domains interconnected by a core domain, the leaf domains and the core domain each configured to perform segment routing with an independent segment routing protocol based on a first block of segment prefix identifiers solely for the core domain, and a second block of segment identifiers for reuse across the leaf domains, the software is operable to:
   receive a triggering event to prompt a request for a path to a second network element in a second domain among the leaf domains, the triggering event including provisioning the first network element with an overlay service route identifying the second network element as a next hop for a service;
   determine the path based on receiving the triggering event without performing any interdomain routing protocol operations, wherein the path includes an interdomain segment identifier list having a segment identifier from the first block and a segment identifier from the second block;
   and
   program an output interface of the first network element with the interdomain segment identifier list of the path.

13. The non-transitory computer readable storage media of claim 12, wherein the provisioning the overlay service route includes identifying a layer-2 pseudo-wire destination, the next hop, the service, and a traffic engineering attribute-set describing traffic engineering objectives and constraints to reach the next hop for the service.

14. The non-transitory computer readable storage media of claim 12, wherein instructions are operable when executed to transmit the request for a path computation to a route information base through a networking protocol.

15. The non-transitory computer readable storage media of claim 12, wherein programming the output interface comprises installing a segment routing traffic engineered tunnel and a corresponding segment identifier for the second network element.

16. The non-transitory computer readable storage media of claim 12, wherein the triggering event comprises receiving a border gateway protocol (BGP) virtual private network (VPN) route advertisement from the second network element.

17. The non-transitory computer readable storage media of claim 16, wherein programming the output interface comprises establishing a transport link state packet for the second network element.

18. The non-transitory computer readable storage media of claim 16, wherein the instructions are operable when executed to receive the BGP VPN route advertisement from an egress provider edge router that represents the second element from across a network protocol.

19. The non-transitory computer readable storage media of claim 12, wherein the software operable to determine the path comprises software operable to:
   request a path computation from a third network element based on receiving the triggering event; and
   receive the path computation from the third network element, the path computation to include the interdomain segment identifier list.

20. An apparatus to serve as a first network element in a first leaf domain among leaf domains interconnected by a core domain, the leaf domains and the core domain each configured to perform segment routing with an independent segment routing protocol based on a first block of segment prefix identifiers solely for the core domain, and a second block of segment identifiers for reuse across the leaf domains, the apparatus comprising:

at least one memory element having instruction stored thereon; and at least one processor coupled to the at least one memory element and configured to execute the instructions to cause the first network element to:

receive a triggering event to prompt a request for a path to a second network element in a second domain among the leaf domains, the triggering event including provisioning the first network element with an overlay service route identifying the second network element as a next hop for a service;

determine the path based on receiving the triggering event without performing any interdomain routing protocol operations, wherein the path includes an interdomain segment identifier list having a segment identifier from the first block and a segment identifier from the second block; and   program an output interface of the first network element with the interdomain segment identifier list of the path.

21. The apparatus of claim 20, wherein the overlay service route identifies a layer-2 pseudo-wire destination, the next hop, the service, and a traffic engineering attribute-set describing traffic engineering objectives and constraints to reach the next hop for the service.

22. The apparatus of claim 20, wherein the triggering event comprises receiving a border gateway protocol (BGP) virtual private network (VPN) route advertisement from the second network element.

23. The apparatus of claim 22, wherein the processor is configured to determine that path by requesting a path computation from a third network element based on receiving the triggering event; and  receive the path computation from the third network element, the path computation to include the interdomain segment identifier list.

\* \* \* \* \*